(12) United States Patent
Vinarcik

(10) Patent No.: US 6,640,451 B1
(45) Date of Patent: Nov. 4, 2003

(54) SYSTEM AND METHOD FOR SENSING THE ANGULAR POSITION OF A ROTATABLE MEMBER

(75) Inventor: Edward John Vinarcik, Ft. Wayne, IN (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/496,021

(22) Filed: Jun. 14, 2000

(51) Int. Cl.$^7$ .................................................. G01B 7/00

(52) U.S. Cl. ...................... 33/1 PT; 33/708; 33/DIG. 1; 324/207.2; 29/595

(58) Field of Search .............................. 33/1 PT, 706, 33/708, 772, 773, DIG. 1; 324/207.22, 207.25, 207.15, 207.16, 207.21, 207.2; 29/592.1, 595, 825

(56) References Cited

U.S. PATENT DOCUMENTS

| | | | |
|---|---|---|---|
| 2,944,157 A | * 7/1960 | McAuslan et al. | .......... 33/1 PT |
| 3,930,201 A | * 12/1975 | Ackermann et al. | ........... 328/1 |
| 4,121,112 A | 10/1978 | Hartig | |
| 4,150,314 A | * 4/1979 | Zabler et al. | ............... 310/155 |
| 4,152,655 A | 5/1979 | Przybyla et al. | |
| 4,193,199 A | * 3/1980 | Whiteley et al. | ........... 33/1 PT |
| 4,280,165 A | * 7/1981 | Pospelov et al. | ........... 361/236 |
| 4,305,072 A | * 12/1981 | Makita | .................. 340/870.31 |
| 4,466,189 A | * 8/1984 | Tobin, Jr. | .................... 33/1 PT |
| 4,687,952 A | 8/1987 | Capizzi, Jr. | |
| 4,797,827 A | 1/1989 | Cockerham | |
| 4,814,704 A | * 3/1989 | Zerrien, Jr. et al. | ......... 324/208 |
| 4,835,505 A | * 5/1989 | Hattori et al. | ............... 335/302 |
| 4,905,507 A | * 3/1990 | Klein et al. | ................. 73/118.1 |
| 5,145,614 A | * 9/1992 | Kuroda | ......................... 264/24 |
| 5,416,457 A | * 5/1995 | Nakatsuka et al. | ......... 335/302 |
| 5,497,748 A | 3/1996 | Ott et al. | |
| 5,545,368 A | 8/1996 | Vinarcik | |
| 5,606,254 A | * 2/1997 | Xie et al. | .................... 324/174 |
| 5,977,765 A | * 11/1999 | Gibson et al. | ......... 324/207.25 |
| 6,046,584 A | * 4/2000 | Nakane et al. | ......... 324/207.22 |
| 6,144,197 A | * 11/2000 | Shimamura et al. | ... 324/207.21 |

FOREIGN PATENT DOCUMENTS

| | | | |
|---|---|---|---|
| DE | 2920084 | * 11/1980 | ................... 33/706 |
| DE | 0261420 | * 10/1988 | ................... 33/706 |
| JP | 63026532 | 2/1988 | |
| JP | 63148105 A | * 6/1988 | ............ 324/207.21 |
| JP | 63238513 A | * 10/1988 | ............ 324/207.25 |
| JP | 0155206 | * 6/1989 | ................... 33/706 |
| JP | 06349660 A | * 12/1994 | |

OTHER PUBLICATIONS

Translation of Foreign Patent Document JP 06–349660 entitled "Manufacture of Cylindrical Resin Magnet", Translated by Shreiber Translations, Inc. , labeled PTO 2003–2071.*

* cited by examiner

Primary Examiner—Diego Gutierrez
Assistant Examiner—Lydia M. De Jesús
(74) Attorney, Agent, or Firm—Daniel J. Sepanik

(57) ABSTRACT

The present invention relates to a system and method for sensing the angular position of a rotatable member. The system and method employ the use of a composite rotatable member comprising a solidifiable material and a magnetically attractable particulate material. The rotatable member has a major body portion and at least one magnetically detectable reference point. The reference point has a first magnetic property and the major body portion has a second magnetic property, different from the first magnetic property. A magnetic property sensor is fixed relative to the rotatable member to detect the passage of the reference point within the rotatable member. The sensor produces a signal in response to the passage of the reference point. A central processing unit is provided for determining the angular position of the rotatable member in response to the signal generated by the sensor.

17 Claims, 2 Drawing Sheets

SYSTEM AND METHOD FOR SENSING THE ANGULAR POSITION OF A ROTATABLE MEMBER

TECHNICAL FIELD

The present invention relates to a system and method for sensing the angular position of a rotatable member. The present invention also relates to a rotatable member for use with a system and method for sensing the angular position of the rotatable member.

BACKGROUND ART

Many different types of rotatable members are used in automobiles and in other devices. Examples of rotatable devices include, but are not limited to, gears, bearings, shafts, tires, rotors, is hubs, and wheels. There are many instances where it is desirable to determine the angular position of these and other types of rotatable members. In automotive applications, it is desirable to sense the angular position of a gear, for instance, in the engine and drive train for startup and engine operation.

Typically, to sense the angular position of a toothed gear, at least one tooth is removed or shortened relative to the other teeth, and a magnetic sensor is provided to detect the absence of the tooth or the presence of a smaller tooth, as the case may be. Examples of such methods and apparatuses are shown in U.S. Pat. Nos. 4,797,827, 4,687,952, 4,152,655 and 5,497,748.

These types of gears which have a missing tooth or a shortened tooth have many shortcomings. For instance, gears that have a missing tooth or a shortened tooth are more susceptible to stresses, breakage, wear and noise relative to gears that do not have a missing or shortened tooth. As such, it would be desirable to provide a method and system for sensing the angular position of a rotatable member which does not rely on a missing tooth or a shortened tooth to determine the angular position of the rotatable member.

DISCLOSURE OF INVENTION

It is an object of the present invention to provide a method and system for sensing the angular position of a rotatable member which does not rely on a missing tooth or a shortened tooth to determine the angular position of the rotatable member.

It is another object of the present invention to provide a rotatable member which does not have any missing or shortened teeth and whose angular position is readily determinable.

The above and other objects of the present invention are met by providing a system and method for sensing the angular position of a rotatable member. The system and method employ the use of a composite rotatable member comprising a solidifiable material and a magnetically attractable particulate material. The rotatable member has a major body portion and at least one magnetically detectable reference point. The reference point has a first magnetic property and the major body portion has a second magnetic property, different from the first magnetic property. A magnetic property sensor is fixed relative to the rotatable member. The sensor is able to detect the passage of the reference point within the rotatable member. The sensor produces a signal in response to the passage of the reference point. A central processing unit is provided for determining the angular position of the rotatable member in response to the signal generated by the sensor.

BEST MODE FOR CARRYING OUT THE INVENTION

Figure 1:
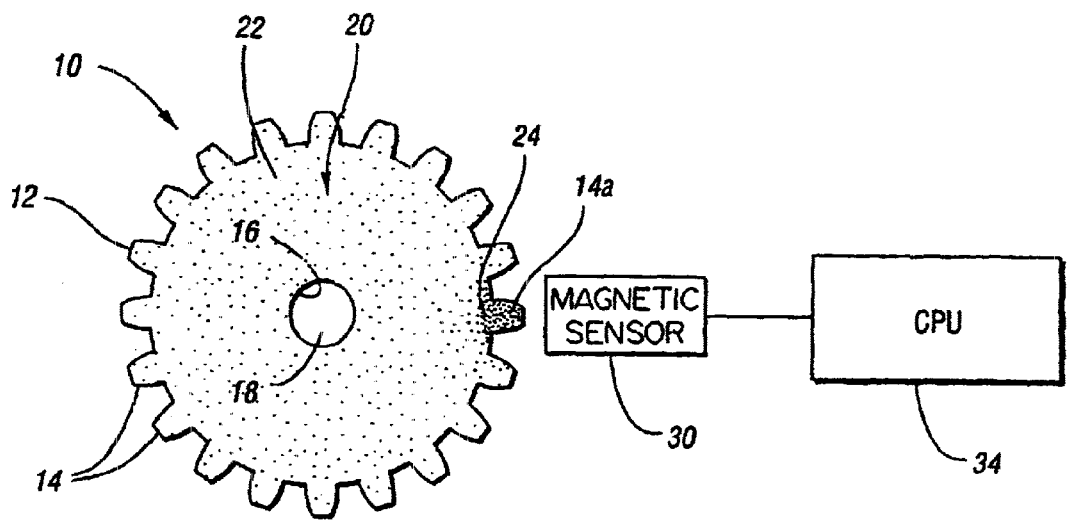
FIG. 1 is a schematic illustration of the present invention.

Referring to FIG. 1 composite rotatable member 10 for use with the present invention is shown. The rotatable member 10 is shown in a preferred embodiment to be a gear, but could be other rotatable members such as a bearing, shaft, tire, rotor, hub or wheel. The rotatable member 10 has a generally circumferential radial edge surface 12 including a plurality of teeth 14. The rotatable member 10 also includes a generally cylindrical hole 16. A shaft 18 extends through the hole 16 of the rotatable member 10 to effect rotational movement of the composite rotatable member 10.

The rotatable member 10 comprises a solidified composite material 20. The composite material 20 comprises a non-magnetically attractable solidifiable material 22 and a magnetically attractable particulate material 24. The non-magnetically attractable solidifiable material 22 is defined here as a fluid or liquid or pseudo-liquid which solidifies or hardens at a later stage into a substantially solid or rigid form. The solidifiable material 22 is in a fluid, liquid or pseudo-liquid state at a temperature below the melting point of the magnetically attractable particulate material 24.

Generally, the solidifiable material 22 is poured or injected into a mold or die or other type of "form" while in a fluid state, and then allowed to solidify into a rigid state, for example, by cooling, chemical reaction or other. Suitable examples of these solidifiable materials 22 include, but are not limited to, plastic, rubber, elastomer, and certain low temperature melting point metals and alloys, and combinations thereof. Some of the plastic materials is include, but are not limited to, the epoxies, thermo-set materials, thermoplastic materials and others. Suitable examples of low melting point metals include, but are not limited to, magnesium, tin, zinc, lead, and aluminum. Suitable examples of low melting point alloys include, but are not limited to, alloys of the before-mentioned metals.

The magnetically attractable particulate material 24 for use with the present invention include, but is not necessarily limited to, ferritic metals. Suitable examples of such include, but are not limited to phero magnetic particles ferritic carbon steel, ferritic stainless steel, ferritic high strength low alloy steels, cast irons, and ferritic alloyed steels. Particularly preferred magnetically attractable particulate materials 24 are 1008–1010 steel, iron, and ferritic grade stainless steels. The magnetically attractable particulate material 24 may be in the form of filings, powders, whiskers or fibers. In one particular preferred embodiment, the magnetically attractable particulate material 24 are cold rolled steel fillings or filings in the form of whiskers.

The magnetically attractable particulate material 24 has a first magnetic property, as detectable by a magnetic sensor. The solidifiable material 22 has a second magnetic property, different from the first magnetic property, so as to be readily distinguishable by a magnetic property sensor.

As shown in FIG. 1, rotatable member 10 has at least one tooth 14a, which has a first volume percent of magnetically attractable particulate material 24. The remainder of the rotatable member 10, or the major body portion of the rotatable member, has a second volume percent of magnetically attractable particulate material, substantially less than the first volume percent. The difference in volume percent results in the reference point 14a having a first magnetic property, and the major body portion having a second magnetic property, less than and distinguishable from the first magnetic property. The difference in the magnetic properties of the reference point 14a and the major body portion enables the reference point 14a to be readily distinguishable from the major body portion by a magnetic property sensor. Preferably, the first volume percent is at least about 1.5 times greater than the second volume percent, more preferably about five times greater, and most preferably about 10 times greater.

As shown in FIG. 1, a magnetic sensor 30, is fixed adjacent to the rotatable member 10. The magnetic sensor 30 detects the passage, or rotation, of the reference point 14a of the rotatable member 10. While any suitable magnetic sensor 30 is useable, it is contemplated that the magnetic sensor is an induction coil, a Hall-effect type sensor, or an Eddy sensor. Such sensors are available from Delphi, Bendix, and others. Upon the passage of the reference point 14a, the magnetic sensor 30 generates a signal which is directed to a central processing unit 34 (CPU). The signal may be digital (pulse) or analog. The central processing unit 34 is capable of calculating the angular position of the rotatable member 10 based at least in part on the signal generated by the magnetic sensor 30. The manner in which the CPU 34 determines the angular position of the rotatable member 10 is well known in the art and as such will not be described herein.

Figure 2:
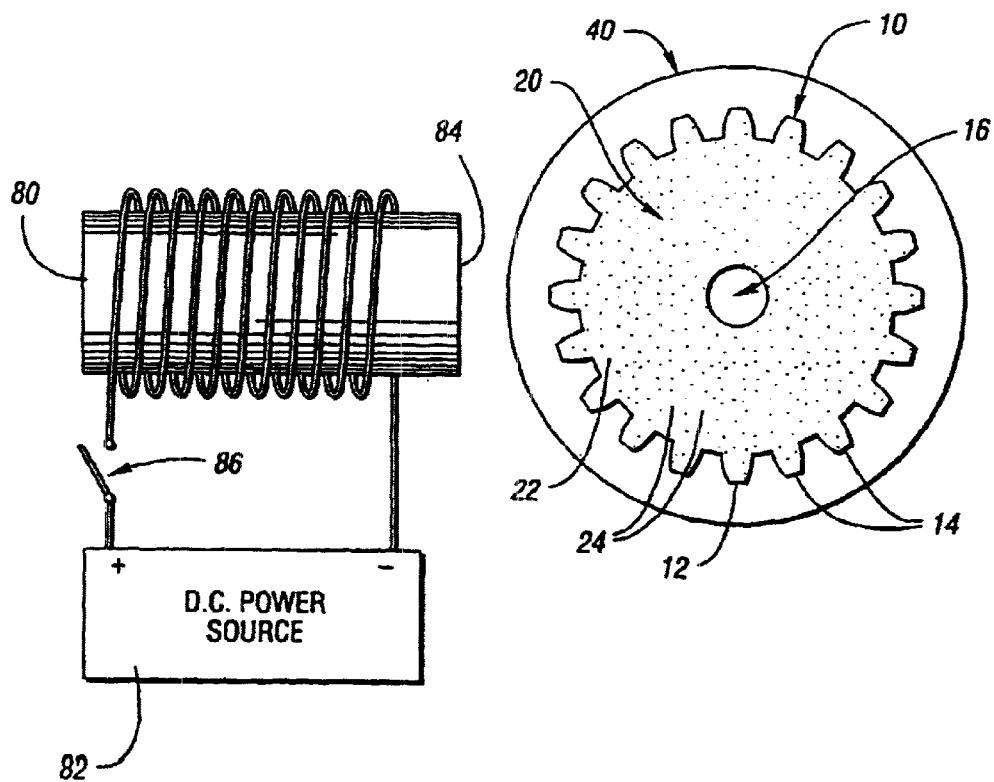
FIG. 2 is a schematic illustration of a rotatable member for use with the present invention containing a mixture of a solidifiable material and magnetically attractable particulate material prior to application of a magnetic field.
Figure 3:
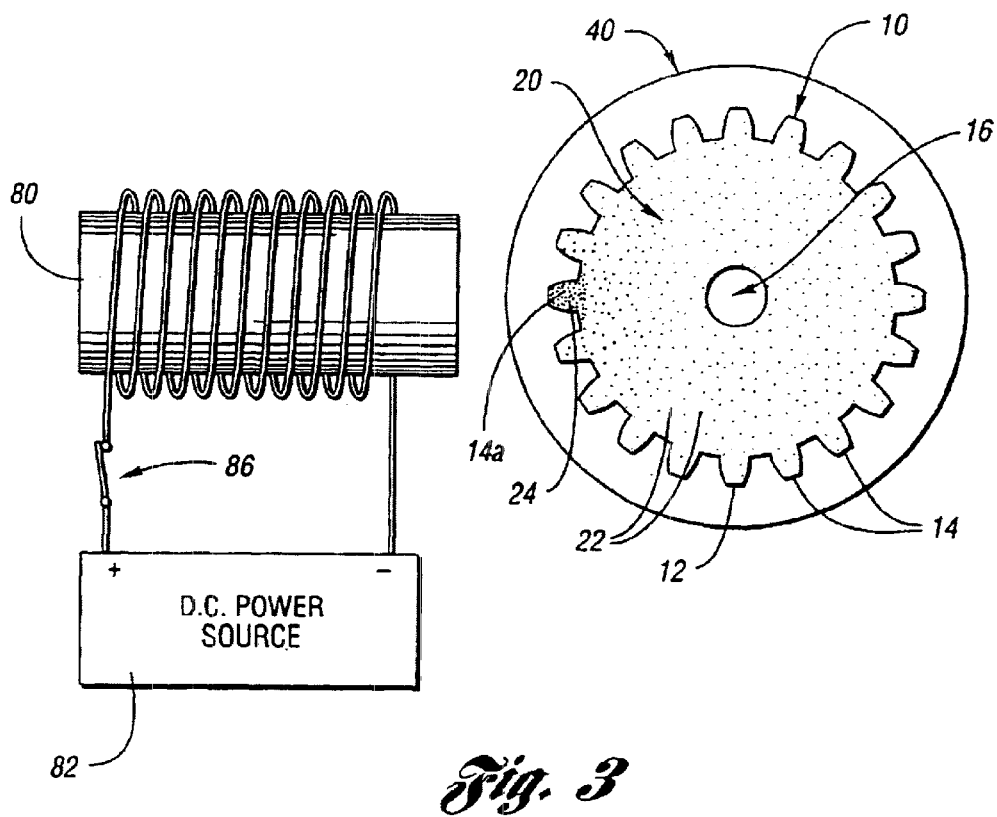
FIG. 3 is a schematic illustration of a rotatable member for use with the present invention containing a mixture of a solidifiable material and magnetically attractable particulate material after application of a magnetic field.
Figure 4:
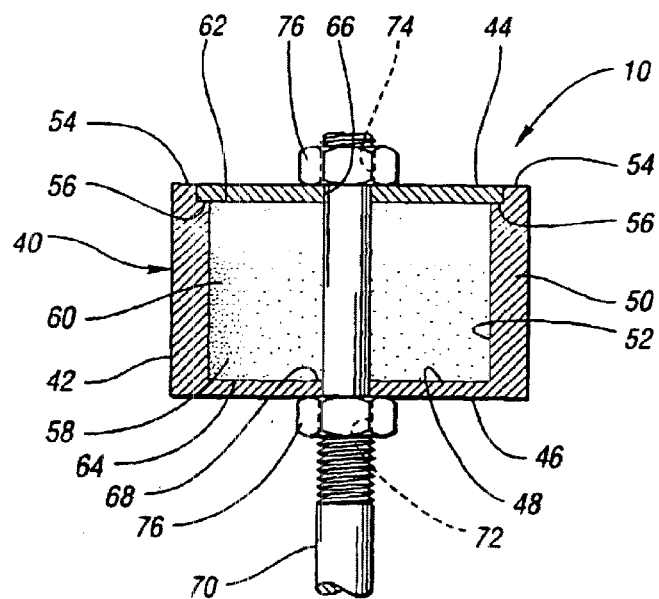
FIG. 4 is a sectional view taken along line 4—4 of FIG. 3.

A mold, generally indicated at 40, and shown in FIGS. 2–4, is used to make the composite rotatable member 10.

The mold 40 includes a base 42 and a cover 44. The base 42 has a bottom wall 46 with an inside surface 48, a generally cylindrical circumferential side wall So with its own inside surface 52 and a generally annular upper edge 54. The upper edge 54 of the side wall 50 has a generally annular recessed step 56 to receive the cover 44 when the mold 40 is assembled for molding. The cover 44 is generally flat and circular in configuration.

The mold 40 also includes a cavity 58 in the shape of the composite rotatable member 10 to be molded. The side wall 50 of the base 42 has a series of equally spaced radial recesses (only one 60 of the releases are shown) on the inside surface 52 to form the teeth 14, 14a of the composite rotatable member 10 during the molding process, as is typical in the molding art. Recess 60 forms tooth 14a. The inside surface 48 of the bottom wall 46 forms a first side surface 62 of the composite rotatable member 10, and the inside surface of the cover 44 forms a second side surface 64 of the composite rotatable member 10. The cover 44 has a generally circular hole 66 through its center, and the base 42 has a generally circular hole 68 through the center of its bottom wall 46 which aligns with the hole 66 in the cover 44 when the mold 40 is assembled.

The mold 40 further includes a generally cylindrical molding shaft 70 extending through the holes 66 and 68 in the cover 44 and base 42, respectively, with enough clearance to insert the shaft 70 into and remove it from the holes 66 and 68, but not so much clearance that the assembled mold 40 will leak during the molding operation. The shaft 70 has a first set of threads 72 at a lower position and a second set of threads 74 at an upper position. Retaining nuts 76 are threadably attached to the shaft 70 at these positions to hold the mold 40 together during molding, as should be well recognized by those skilled in the molding art. The shaft 70 also serves to form the central hole 16 in the rotatable member 10 when formed, as is typical of gears. Thus, the cylindrical axis of the shaft 70 coincides with the cylindrical axis of the hole 16 passing through the rotatable member 10. When the mold 40 is assembled, the cover 44 fits into the recessed step 56 in the upper edge 54 of the side wall 50 of the base 42, with the shaft 70 extending there through and with the retaining nuts 76 attached, so as to complete the closed cavity 58 for making the composite rotatable member 10.

The mold 40 can be made according to any of the well known mold making techniques commonly in use, and made out of many different materials. However, as will be appreciated more fully hereinafter, in this particular embodiment, the mold 40 is made of non-magnetic material such as sand, brass, aluminum, rubber, etc.

The rotatable member 10 is made of the solidifiable material as previously defined. In one embodiment, epoxy is the solidifiable material. As is well known in the art, epoxy materials are two component compounds of a resin material and a hardener material. When the two materials are mixed together in proper proportions, a chemical reaction causes the mixture to gradually harden or set over a predetermined period of time. The time depends on the particular epoxy used, and may vary from material to material. Preferably, the epoxy is a polyester material. When initially mixed, both materials are in a fluid state and the initial mixture itself is in a fluid state.

The rotatable member 10 is also made of the magnetically attractable particulate material 24 as previously defined. In one embodiment, the magnetically attractable particulate material 24 are cold rolled steel filings in the form of fibers added to the solidifiable material 22 and mixed such that the solidifiable composite mixture 20 is in a fluid state. The composite mixture 20 is poured or injected into the mold 40. The solidifiable composite mixture fills the mold 40, taking on its shape, and when allowed to solidify or harden in the mold 40, produces the composite rotatable member 10 conforming the shape of the mold 40.

The solidifiable composite mixture 20 is put into the mold 40, typically as in other molding or casting operations well known in the art. In one embodiment, the solidifiable composite mixture 20 is added to the cavity 58 in the base 42 of the mold 40 by pouring, after the shaft 70 has been extended through the hole 68 in the bottom wall 46 of the base 42 with the lower retaining nut 76 attached to the threads 72.

After the base 42 of the mold 40 has been filled with the solidifiable composite mixture 20, the mold 40 is substantially sealed by fitting the cover 44 to the base 42 as described above with the distal end of the shaft 70 extending through the central hole 66 in the cover 44. The shaft 70 is secured to the mold 40 by attaching the retaining nut 76 to the threads 74 at the distal end of the shaft 70, so that the fluid does not leak out of the mold 40 while it is solidifying, and while other steps of the method are carried out.

After the mold 40 is filled and sealed, and while the solidifiable composite mixture 20 is solidifying from its fluid state to its solidified state, the particulate material 24 is migrated to the tooth 14a to form a reference point for allowing the angular position the rotatable member 10 to be determined, as disclosed above.

As illustrated in FIGS. 2 and 3, at least one magnet 80 such as an electromagnet is positioned adjacent the mold 40 with direct current power applied from a D.C. power source 82 while the mold 40 is stationary. The magnet 80 is selectively located to a predetermined location, adjacent tooth 14a, relative to the mold 40. The magnet 80 is centered between the first and second side surfaces 62 and 64 of the composite rotatable member 10 as molded, with one magnetic pole 84 radially adjacent the recess 60 in the base 42 of the mold 40 which form the tooth 14a of the composite rotatable member 10. The magnet 80 is displaced radially from the mold 40, and close enough to attract and migrate the magnetically attractable particulate material 24 in the solidifiable composite mixture 20.

A normally opened switch 86 is disposed between the magnet 80 and the power source 82. When opened, as shown in FIG. 2, the magnetically attractable particulate material 24 is essentially uniformly dispersed throughout the composite mixture 20 within the mold 40.

As shown in FIG. 3, the magnet 80, when the switch 86 is closed, produces a non-uniform magnetic field relative to the mold 40. The magnetically attractable particulate materials 24 are susceptible to magnetic forces and the solidifiable material 22 is not. As a result, the magnet field selectively applies a non-uniform magnetic force on the magnetically attractable particulate material 24.

While the solidifiable composite mixture 20 is still in its fluid state prior to solidifying, the magnetically attractable particulate material 24 migrate in response to, and under the selective influence of the magnetic force, toward the side wall 50 of the base 42 of the mold 40. The magnetically attractable particulate material 24 is concentrated into, and near, the predetermined location in the recess 60 of the mold 40 which forms the teeth 14a of the composite rotatable member 10, at the surfaces thereof.

It should also be appreciated that the magnetic field may be applied as the mixture 20 is simultaneously poured, cast or injected into the mold 40.

The timing and strength of the magnetic field will depend on various factors such as the composition, setting time, temperature, viscosity, etc., of the solidifiable material, the migrating time and desired concentrations of the magnetic reinforcing particles, and other factors. Such factors can be determined empirically. The magnetic force must be strong enough to migrate the magnetically attractable particulate material 24, in the desired concentrations and gradients, to the predetermined portion of the mold 40 before the solidifiable material 22 has solidified. It should be appreciated that the mold 40 may be placed in a curing oven at a 150 degrees for 15 minutes to cure the composite rotatable member 10.

After the composite mixture 20 has sufficiently solidified according to normal molding practice, the magnetically attractable particulate material 24 will be bound in the solidified material 22 in and near the tooth 14a of the rotatable member 10, and the mold 40 can be disassembled, and the rotatable member 10 removed therefrom. The rotatable member 10 will have a non-uniform distribution of magnetically attractable particulate material 24, with a higher concentration (the first volume percent) and higher proportion of magnetically attractable particulate material 24 in the tooth 14a, than the average concentration (the second volume percent) of magnetically attractable particulate material 24 in the other teeth 14 of the composite rotatable member 10 as a whole. The tooth 14a, thus, has a different magnetic property than the rest of, or major body portion of, the composite rotatable member 10.

Having a different magnetic property allows the tooth 14a to be a magnetically reference point so that the magnetic sensor 30 (FIG. 1) can detect the passage of the tooth 14a. Upon the detection of the passage of the tooth 14a, the sensor 30 directs a signal to the CPU 34 which enables the CPU to determine the angular position of the rotatable member 10. It should be readily understood that the CPU 34 could, in addition to, or as an alternative to, determining angular position, could determine other rotational data or information, such as rotational speed of the rotatable member 10.

While the present invention has been mainly described with respect to a toothed gear, it should be readily appreciated that a magnetically detectable reference point can be formed in other rotatable members, such as a shaft and tire, using the same process described above with the only exception being changing the shape of the mold to suit the particular shape of the desired rotatable member. Also, it should be readily appreciated that the rotatable member 10 may have more than one magnetically detectable reference points 14a. For instance, the rotatable member 10 could have four equally spaced teeth 14a having appreciable amounts of magnetically detectable particulate material 24 therein to have four magnetically detectable reference points. In many instances, it would be desirable to have additional reference points to balance the rotatable member 10 or to provide higher resolution detection capabilities. Also, more than one sensor can be employed to provide better or different detection capabilities.

While the best mode for carrying out the invention has been described in detail, those familiar with the art to which this invention relates will recognize various alternative designs and embodiments for practicing the invention as defined by the following claims.

What is claimed is:

1. A system for sensing the angular position of a rotatable member, the system comprising:

a composite rotatable member comprising a solidifiable material and a magnetically attractable particulate material dispersed throughout said solidifiable material, the rotatable member having a major body portion and at least one magnetically detectable reference point in the major body portion defined by a concentrated portion of said magnetically attractable particulate material, the reference point having a first magnetic property and the major body portion having a second magnetic property, the reference point containing a first volume percent of the magnetically attractable particulate material and the major body portion containing a second volume percent of the magnetically attractable particulate material, the first volume percent being greater than the second volume percent, the first volume percent being at least about 1.5 times to 10 times greater than the second volume percent; and a magnetic property sensor which is fixed relative to the rotatable member;

the sensor able to detect the passage of the reference point within the rotatable member.

2. The system of claim 1 wherein the sensor comprises an induction coil.

3. The system of claim 1 wherein the rotatable member comprises a gear having a plurality of teeth, the at least one reference point comprises at least one of the plurality of teeth.

4. The system of claim 1 wherein the solidifiable material comprises plastic.

5. The system of claim 4 wherein the magnetically attractable particulate material comprises ferritic material.

6. The system of claim 1 wherein the rotatable member comprises only one magnetically detectable reference point.

7. The system of claim 1, further comprising a central processing unit for determining the angular position of the rotatable member in response to a signal generated by the magnetic property sensor in response to the detection of the passage of the referenced point.

8. A composite rotatable member comprising:

a solidifiable material and a magnetically attractable particulate material dispersed throughout said solidifiable material, the rotatable member having a major body portion having a first volume percent of said magnetically attractable particulate material and at least one magnetically detectable reference point in the major body portion having a second volume percent of said magnetically attractable particulate material, the reference point having a first magnetic property and the major body portion having a second magnetic property, different from the first magnetic property, and said second volume percent is at least about 1.5 times to 10 times greater than said first volume percent.

9. The rotatable member of claim 8 wherein the solidifiable material comprises plastic.

10. The rotatable member of claim 8 wherein the magnetically attractable particulate material comprises ferritic material.

11. The rotatable member of claim 8 wherein the rotatable member comprises only one magnetically detectable reference point.

12. A method for sensing the angular position of a rotatable member, the method comprising the steps of:

providing a composite rotatable member comprising a solidifiable material and a magnetically attractable particulate material dispersed throughout the solidifiable material, the rotatable member having a major body portion and at least one magnetically detectable reference point in the major body portion defined by a concentrated portion of the magnetically attractable particulate material, the reference point having a first magnetic property and the major body portion having a second magnetic property, different from the first magnetic property, the reference point containing a first volume percent of the magnetically attractable particulate material and the major body portion containing a second volume percent of the magnetically attractable particulate material, the first volume percent being greater than the second volume percent, the first volume percent being at least about 1.5 times to 10 times greater than the second volume percent;

providing a magnetic property sensor which is fixed relative to the rotatable member;

detecting the passage of the reference point within the rotatable member and producing a signal in response to the passage of the reference point; and providing a processor and determining the angular position at the rotatable member in response to the signal from the sensor.

13. The method of claim 12 wherein the sensor comprises an induction coil.

14. The method of claim 12 wherein the rotatable member comprises a gear having a plurality of teeth, the at least one reference point comprising at least one of the plurality of teeth.

15. The method of claim 12 wherein the solidifiable material comprises plastic.

16. The method of claim 15 wherein the magnetically attractable particulate material comprises ferritic material.

17. The method of claim 12 wherein the rotatable member comprises only one magnetically detectable reference point.

* * * * *